(12) United States Patent
Varadarajan et al.

(10) Patent No.: US 7,773,841 B2
(45) Date of Patent: Aug. 10, 2010

(54) OPTICAL TURNAROUND

(75) Inventors: Harini Varadarajan, Missouri City, TX (US); Ramaswamy Meyyappan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 224 days.

(21) Appl. No.: 11/551,028

(22) Filed: Oct. 19, 2006

(65) Prior Publication Data

US 2008/0095496 A1    Apr. 24, 2008

(51) Int. Cl.
G02B 6/26 (2006.01)
E21B 47/00 (2006.01)

(52) U.S. Cl. .............................. 385/32; 385/18; 385/24; 385/36; 385/42; 385/43; 385/44; 385/45; 385/46; 385/47; 385/129; 385/130; 385/131; 385/132; 385/12; 166/250.01

(58) Field of Classification Search .................. 385/24, 385/129–132, 32, 42–47, 36, 18, 12; 166/250.1, 166/250.01
See application file for complete search history.

(56) References Cited

U.S. PATENT DOCUMENTS

| | | | |
|---|---|---|---|
| 4,797,549 A | 1/1989 | Ho et al. | |
| 5,138,676 A | 8/1992 | Stowe et al. | |
| 5,163,321 A | 11/1992 | Perales | |
| 5,633,494 A * | 5/1997 | Danisch | 250/227.16 |
| 6,314,219 B1 | 11/2001 | Zhang et al. | |
| 6,389,209 B1 | 5/2002 | Suhir | |
| 6,546,164 B1 * | 4/2003 | Chen | 385/24 |
| 6,563,971 B1 | 5/2003 | Burton et al. | |
| 6,612,753 B1 | 9/2003 | Cryan et al. | |
| 6,644,402 B1 | 11/2003 | Sharma et al. | |
| 6,731,842 B2 | 5/2004 | Chen | |
| 6,775,436 B1 * | 8/2004 | Schroll et al. | 385/36 |
| 6,789,953 B1 | 9/2004 | deJong et al. | |
| 6,870,992 B2 | 3/2005 | Grosjean et al. | |
| 6,978,832 B2 * | 12/2005 | Gardner et al. | 166/250.1 |
| 6,987,911 B2 * | 1/2006 | Mossberg et al. | 385/37 |
| 7,006,744 B2 * | 2/2006 | Carniel et al. | 385/129 |
| 7,050,681 B2 | 5/2006 | Blauvelt et al. | |

(Continued)

FOREIGN PATENT DOCUMENTS

EP    1780565 A2    5/2007

(Continued)

OTHER PUBLICATIONS

See English Abstract for Cite No. 5—JP10123373A.

*Primary Examiner*—Brian M. Healy
*Assistant Examiner*—Guy G Anderson
(74) *Attorney, Agent, or Firm*—Winstead, PC; Brandon S. Clark; Rodney V. Warfford

(57) ABSTRACT

Fiber optic sensors commonly require a 180 degree turnaround to form a continuous optical circuit. Methods and apparatus for providing 180 degree turnarounds in a fiber optic system that include a shorter radius turnaround then provided by micro-bending the optic fiber are desired. An embodiment of a turnaround apparatus includes a first optic fiber pigtail, a second optic fiber pigtail, and an optical waveguide forming a U-shaped path having an input end optically connected to a first end of the first pigtail and an output end optically connected to a first end of the second pigtail.

9 Claims, 2 Drawing Sheets

U.S. PATENT DOCUMENTS

2006/0257092 A1 * 11/2006 Lu et al. .................... 385/134

FOREIGN PATENT DOCUMENTS

| | | | |
|---|---|---|---|
| EP | 1780565 A3 | 5/2007 |
| GB | 2440061 A | 1/2008 |
| JP | 10-123373 A1 | 5/1998 |
| WO | 0146729 A1 | 6/2001 |
| WO | 2005014976 A1 | 2/2005 |

* cited by examiner

OPTICAL TURNAROUND

FIELD OF THE INVENTION

The present invention relates in general to optical fiber sensor systems utilized in wellbore applications and more specifically to methods and apparatus for affecting a turnaround in a fiber optic cable in a small space without microbending the fiber.

BACKGROUND

In wellbore operations it is beneficial to know the downhole conditions in the wellbore and the surrounding formations. Some examples of downhole conditions or parameters, without limitation, are pressure, temperature, flow and chemical activity. Monitoring of these parameters is beneficial throughout the life of the wellbore and surrounding formation. For example, it is beneficial to monitor these parameters during drilling operations, during production or injection intervals, formation treatment operations (i.e., acidizing, fracturing) and when the wells are shutin. It is further desired, at times to monitor formation parameters away from the producing and injection wellbores by drilling monitoring wellbores. In the past, these parameters and the data representing the parameters were only available at selected times and in selected locations, for example at the wellhead, or when pressure or temperature logs were run. However, with the advent of fiber optic sensors, these parameters can be obtained and monitored in real time and throughout the life of the wellbore and/or formation.

Wellbores by their nature are very limited in space and wellbore operations require conservative utilization of this space. This space limitation is one of the attractive features of fiber optic sensors. For example a fiber optic sensor may be run along the side of a tubular in the wellbore, it may be run separately (typically carried by a plug) or run in a dedicated tubular or in some applications a U-shaped tubular. Fiber optics sensors may also be run, or pumped with a treating fluid through the perforations in the wellbore into the surrounding formation.

However, there are some shortcomings and drawbacks in the current fiber optic sensor technology, in particular in regard to reservoir monitoring using distributed temperature sensors ("DTS"). In DTS assemblies, it is typically required to turn the fiber through 180 degrees in a very small space. Simply bending the fiber tightly is not a satisfactory option because tight bends can cause high bending losses and high bending stresses which increase the probability of fiber failures over time.

A common method for creating tight bends is referred to as micro- or miniature bending, via etching and/or heating and drawing the optical fiber to reduce its diameter to a few microns. Several drawbacks are associated with these methods, including the requirement of specialized equipment and algorithms to precisely control the tapered transition region between the original fiber diameter and the reduced diameter section; and that the reduced diameter section is extremely fragile. These drawbacks are very significant and limiting in the context of fiber optic installations in wellbores.

Wellbores provide very harsh and challenging conditions. Often wellbores encounter very high temperatures, pressures and equipment vibrations from fluid flow. The wellbore environment is very turbulent or violent. Flowing fluid often carries formation material and/or aggregate. Further, wellbore tools and equipment will be positioned throughout the confined spaces of the wellbore. Thus, the fiber optic cable and the fiber turnarounds must be robust.

It is noted that optic fibers utilized in wellbore applications are typically multi-mode, and thus have a larger core diameter than single-mode fibers. Also, the fibers are typically run as part of a fiber optic cable, thus the size of the cable and the space occupied in the wellbore can be significant. This increased sized, due to limited turnaround radius can eliminate some applications.

Therefore, it is a desire to provide an optical turnaround that addresses drawbacks of other systems. It is a farther desire to provide a method and apparatus for turning an optic fiber substantially 180 degrees in a reduced space relative to current micro bending techniques. It is a still further desire to provide a fiber optic wellbore monitoring system utilizing an improved optical turnaround.

SUMMARY OF THE INVENTION

In view of the foregoing and other considerations, the present invention relates to fiber optic sensor systems and methods and apparatus for providing a robust optical circuit with an optical turnaround.

Accordingly, an embodiment of a turnaround apparatus is provided. The apparatus having a first optic fiber pigtail, a second optic fiber pigtail, and an optical waveguide forming a U-shaped path having an input end optically connected to a first end of the first pigtail and an output end optically connected to a first end of the second pigtail.

In another embodiment a fiber optic sensor system for measuring a parameter is provided. The system includes a first optic fiber having a terminal end and an opposing end; a second optic fiber having a terminal end and an opposing end; a waveguide forming a U-shaped path having an input end optically connected to the opposing end of the first optic fiber and an output end optically connected to the opposing end of the second optic fiber forming a substantially continuous optic fiber; and a sensor for sensing a parameter and conducting a signal responsive to the parameter via the substantially continuous optic fiber.

In another embodiment a method for a method for measuring a parameter in a wellbore is provide. The method including the steps of providing a non-optic fiber waveguide forming a U-shaped path formed between an input end and an output end; forming a continuous optical circuit by connecting a first optic fiber to the input end and second optic fiber to the output end; deploying the continuous optic circuit into the wellbore; sensing a parameter; and conducting a signal responsive to the parameter via the continuous optical circuit.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
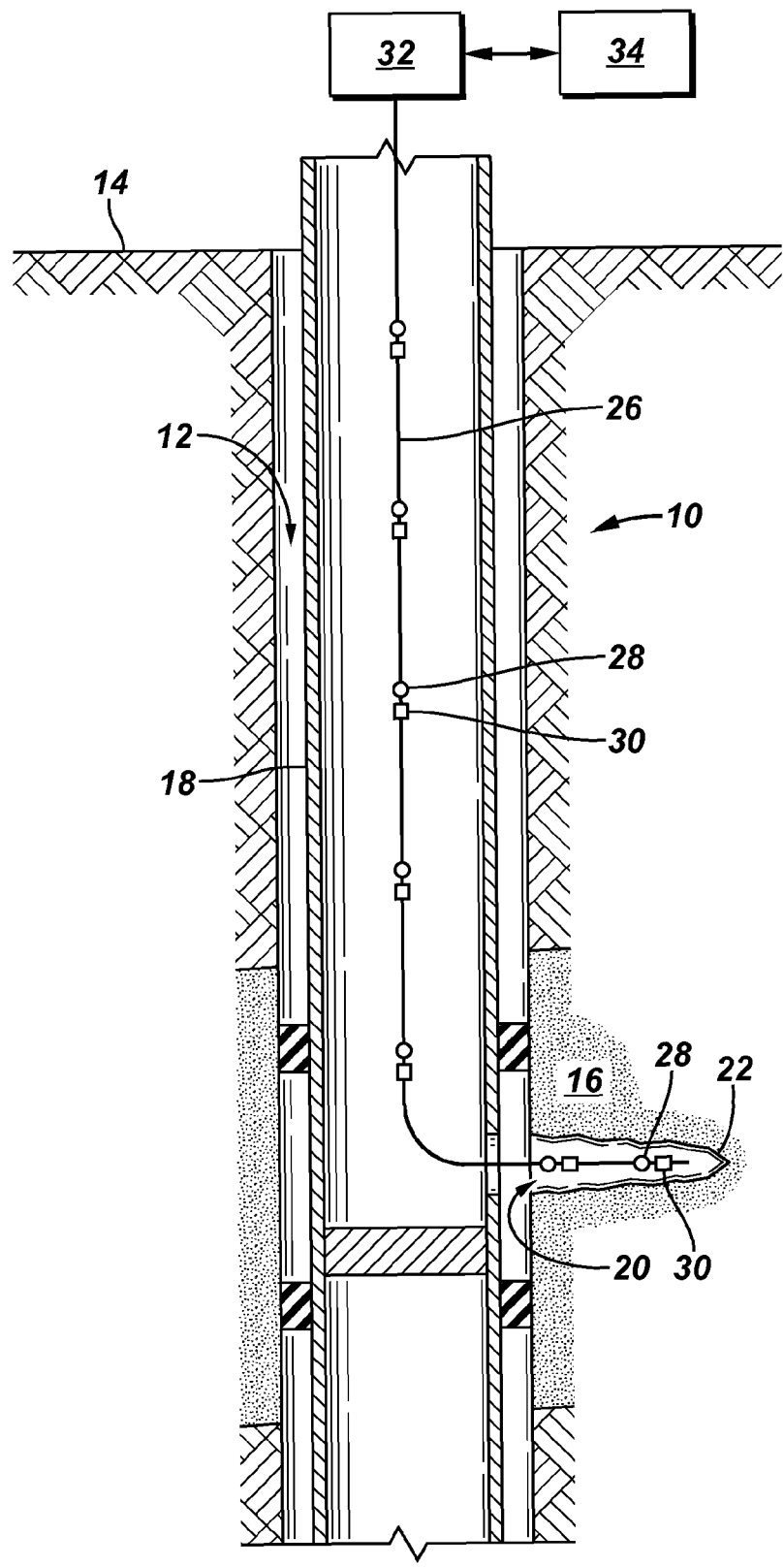
FIG. 1 is a wellbore schematic illustrating the deployment of an embodiment of a fiber optic sensor system of the present invention.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

FIG. 1 is a schematic of an embodiment of a fiber optic sensor system of the present invention, generally denoted by the numeral 10. A wellbore 12 is drilled from the surface 14 of the earth into an earthen formation 16. Wellbore 12 may include casing 18. Casing 18 may be perforated 20 to form channels 22 into a desired portion of formation 16. Wellbore 18 may be drilled for producing fluid from formation 16 and/or injecting a fluid into formation 16. It is further noted, that wellbore 12 may be a monitoring well, for example a well drilled by coiled tubing or other means having a reduced diameter (for example, 1.5 inches (3.3 cm)) primarily for monitoring formation 16 parameters.

Fiber optic sensor system 10 includes a one or more optic fibers 24 (FIG. 3) illustrated as a fiber optic cable 26 in FIG. 1. Fiber optic cable as used in this description and in the claims includes the cable's optical fiber of fibers, which may alone have parameter sensing capabilities, as well as any other sensor device integrally or otherwise connected to the optical fiber(s). In the embodiment illustrated in FIG. 1, fiber optic cable 26 includes a plurality of fibers including sensor devices 28 and an optical turnaround 30 of the present invention.

Fiber optic cable 26 can be formed of single-mode or multiple-mode fiber(s). The fibers may be silicon or polymer or other suitable material, and desirably have corrosion and abrasion resistant coating. Cable 26 may be disposable.

Examples of optical sensor 28 include without limitation pressure sensor, cable strain sensor, micro-bend sensor, chemical sensor and spectrographic sensor. Sensor 28 (or the fiber itself) is positioned to conduct a signal responsive to at least one parameter. The parameter to be measured can be any one or more phenomena that can be sensed using fiber optic technology. Examples of parameters that may be measured or sensed, without limitation are pressure, temperature, seismic activity and chemical activity.

In the illustrated embodiment, fiber optic cable 26 with integrated sensors 28 (or in which the fiber itself is the sensor) is deployed into wellbore 12 and channel 22 in formation 16. Fiber optic cable 26 is deployed from fiber dispensing device 32. Fiber optic cable 26 may be deployed by pumping a fluid, such as a drilling mud or fracturing fluid, carrying fiber optic cable 26 into wellbore 12 and formation 16. Other means for deploying and positioning fiber optic cable 26 may be utilized. For example, fiber optic cable 26 may be carried by or on a tubular (not shown) such as in a distributed temperature sensing application.

An end or the ends of optical fiber cable 26 is connected through an optical coupler which splits and couples light signals as known in the art to a light source and an optical signal receiver. The optical coupler, light source and optical signal receiver are referred to generally as the optical controls 34. Light reflecting back from sensors 28 (or intrinsic sensing portion of the fibers) constitutes an optical signal that contains information regarding a parameter, pressure and temperature for example. The fibers include optical turnaround 30 for reducing the turn radius of the fiber to return the signal.

Figure 2:
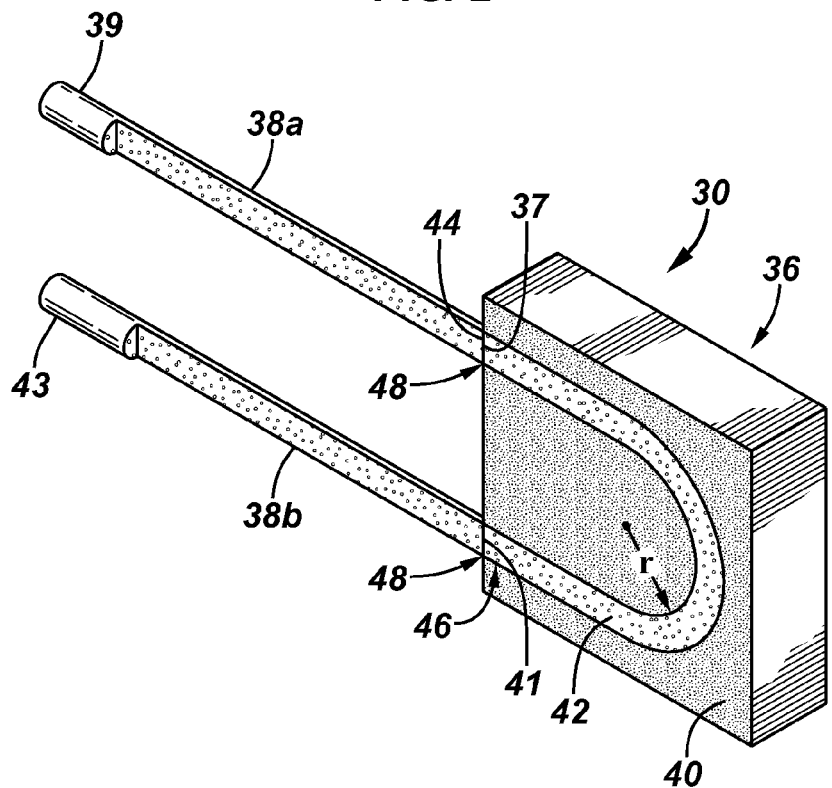
FIG. 2 is a perspective view of an embodiment of an optical turnaround of the present invention.

FIG. 2 is a perspective view of an embodiment of an optical turnaround 30 of the present invention. Optical turnaround 30 includes an optical waveguide 36 and optic fiber pigtails 38a, 38b. Optical turnaround 30 may be hermetically or micro-hermitically sealed for its intended application.

Optical waveguide or "waveguide" is generally defined to denote a structure adapted for supporting one or more propagating optical modes. It shall typically provide confinement of a supported optical mode in two transverse dimensions while allowing propagation along a longitudinal dimension. Optical waveguides include "planar optical waveguides" (planar waveguide) and denotes any optical waveguide that is provided on a substantially planar substrate. Examples of such planar waveguides includes, without limitation, ridge waveguides, buried waveguides, semiconductor waveguides, silica-based waveguides, polymer waveguides, core/clad type waveguides, multilayer reflector waveguides, metal-clad waveguides, air-guided waveguides, vacuum-guided waveguides, photonic crystal-based or photonic bandgap-based waveguides, and waveguides incorporating electro-optic (EO) and/or electro-absorptive (EA) materials and non-linear-optical materials (NLO).

Optical waveguide 36 illustrated in the present embodiment, is a planar lightwave circuit (PLC) waveguide comprising a substrate 40 and waveguide core 42. Waveguide core 42 forms a U-shaped path for transmitting light. Substrate 40 is silicon with an interposed silica or silica-based optical buffer layer (not shown). Silica and silica-based materials are well understood optical materials and have optical properties comparable to those of most single- and multi-mode optical fibers. Substrate 40 may be constructed of other suitable materials, including semiconductor, crystalline, other glasses, ceramic, and metal.

Substrate 40 may comprise a semiconductor chip and include integrated sensor 28 circuit (FIG. 1) functionally connected to the U-shaped path 42 for transmitting the parameter measured by sensor 28.

Waveguide core 42 is etched into substrate 40 as is well-known in the art forming a path for transmitting the light signal. Waveguide core 42 has an input end 44 and an output end 46. In the illustrated embodiment, waveguide core 42 has a bend radius "r" such that a light signal passed therethrough is turned 180 degrees.

Waveguide 36 is a non-optic fiber waveguide and provides a U-shaped turnaround or path with a bend radius less than that achieved by conventional miniature or micro-bending techniques for a similar optic fiber while maintaining comparable optical performance. Waveguide 36 provides a short bend radius turnaround without the loss of physical integrity such as by crack propagation in fibers with miniature bending. It is noted that multiple waveguides may be provided on a common substrate to form waveguide circuits.

First optical fiber pigtail 38a has a first end 37 connected to input end 44 of waveguide core 42 and a second end 39. Second optical fiber pigtail 38b has a first end 41 connected to output end 46 of wave guide core 42 and a second end 43. Pigtails 38 are connected by optical connections 48. Various methods and apparatus may be employed to provide an optical connection or junction between the fiber optic pigtails and the optical waveguide; the fiber optic pigtails and fiber optic cable 24 (FIG. 3); and the fiber optic pigtails, to achieve optical power transfer therebetween. Examples of joining members and methods include, but are not limited to, retainer, clamp, fastener, adhesive, solder, potting or embedding materials, clip, tab/slot, groove, optical contacting, electrostatic and/or magnetostatic forces, springs, wafer-bonding techniques and fusion.

Figure 3:
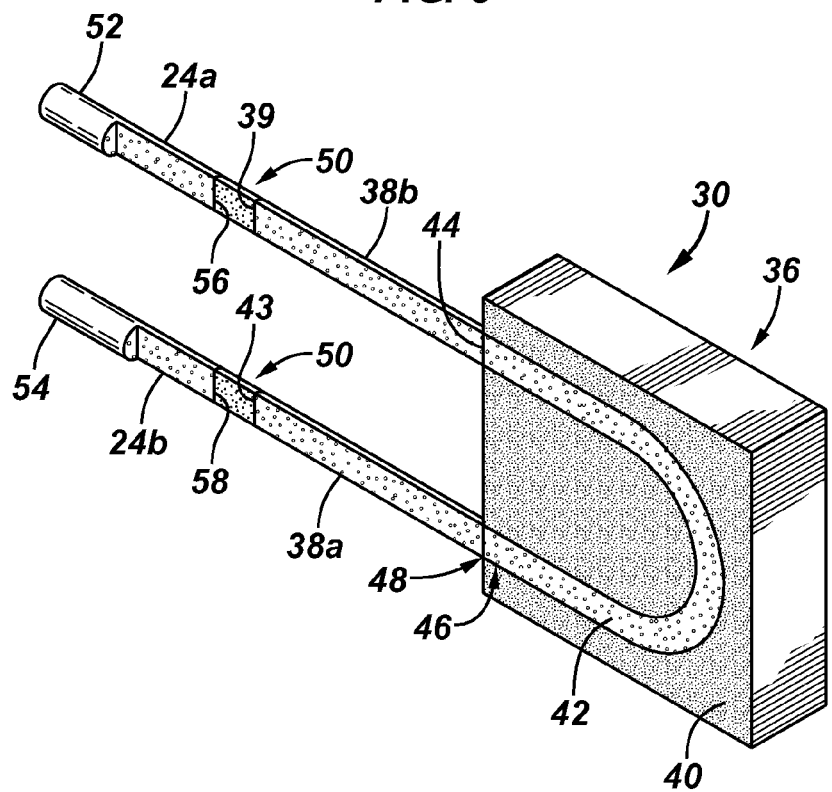
FIG. 3 is a perspective view of an embodiment of an optical turnaround of the present invention optically connected to optic fibers to form a continuous optic circuit having a U-shaped optical turnaround.

FIG. 3 is a perspective view of an embodiment of optical turnaround 30 optically connected within a fiber 24. First optic fiber 24a includes terminal end 52 and an opposing end 56 connected to first pigtail 38a by an optical connection or junction 50. Optic fiber 24b includes a terminal end 54 and an opposing end 58 connected to second pigtail 38b at end 43. Optical junction 50 herein is via fusion. However, various manners of forming optical junction 50 suitable for achieving optical power transfer may be utilized, including those described in relation to connection 48 of FIG. 2. Once connected, optic fibers 24a, 24b and waveguide 36 form a continuous optical circuit having a 180 degree turnaround. Although, the continuous optical circuit is referred to herein as optic fiber 24 or fiber optic cable 26, it is noted that waveguide 36 is a non-optic fiber waveguide.

A method of forming a fiber optic cable with a turnaround of the present invention is now described with reference to FIGS. 1 through 3. A planar substrate 40 is provided having the dimensions desired for the intended application. Substrate 40 of the present example is a semiconductor substrate and may include circuitry for an integrated sensor 28. An optical waveguide core 42 is etched into a layer of substrate 40 having an input end 44 and an output end 46. Waveguide core 42 has a bend radius such that light transferred therethrough is turned approximately 180 degrees ("U-turned").

The bend radius of the light path is less than that currently achieved by conventional micro- or miniature bending of optic fibers 24 while maintaining comparable optic performance. Additionally, the loss of physical integrity in an optic fiber from micro- or miniature bending is avoided. An optic fiber pigtail 38 is optically connected to each end 44, 46 of waveguide core 42. Optical waveguide 36 may then be hermetically sealed.

It is desired to provide a distributed temperature survey in wellbore 12. A first optic fiber 24a is optically connected to first pigtail 24a and a second optic fiber 24b is optically connected to second pigtail 24b to form a continuous optical circuit (also referred to as fiber 24 or fiber optic cable 26). Fiber 24 may be the temperature sensor and/or may include sensor 28. Sensor 28 may be provided by substrate 40 of optical turnaround 30. Fiber 24 may comprise fiber optic cable 26 or may be combined with other fibers to form fiber optic cable 26. The terminal ends 52, 54 (FIG. 3) are connected with optic controls 34 for operation and fiber optic cable (continuous fiber circuit) 26 is deployed in wellbore 12. Fiber optic system 10 may then be operated as is well known in the art to conduct a signal responsive to at least one parameter, temperature in this example.

From the foregoing detailed description of specific embodiments of the invention, it should be apparent that a fiber optic system for with a turnaround formed without micro- or miniature of the optic fiber(s) that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. An apparatus comprising:
    a first multi-mode optic fiber pigtail;
    a second multi-mode optic fiber pigtail;
    a non-optic fiber multi-mode planar waveguide comprising a substrate forming a U-shaped path having an input end optically connected to a first end of the first pigtail and an output end optically connected to a first end of the second pigtail; and
    a sensor formed by the substrate and in functional connection with the U-shaped path to sense a parameter, wherein the parameter selected from the group of pressure, temperature, chemical activity and seismic activity.

2. The apparatus of claim 1, wherein the U-shaped path has a bend radius less than that of miniature bend that can be formed in the pigtails with comparable optic performance.

3. The apparatus of claim 1, wherein the U-shaped path is etched in a substrate.

4. The apparatus of claim 2, wherein the U-shaped path is etched in a substrate.

5. A fiber optic sensor system for measuring a parameter, the system comprising:
    a first multi-mode optic fiber having a terminal end and an opposing end;
    a second multi-mode optic fiber having a terminal end and an opposing end;
    a non-optic fiber multi-mode planar waveguide comprising a substrate forming a U-shaped path having an input end optically connected to the opposing end of the first multi-mode optic fiber and an output end optically connected to the opposing end of the second multi-mode optic fiber forming a substantially continuous multi-mode optic fiber; and
    a sensor carried on the substrate and functionally connected to the U-shaped path for sensing a parameter and conducting a signal responsive to the parameter via the substantially continuous multi-mode optic fiber, wherein the parameter is selected from the group of pressure, temperature, chemical activity and seismic activity.

6. The system of claim 5, wherein the U-shaped waveguide has a bend radius less than that of miniature bend that could be formed in the first or second optic fiber with comparable optical performance.

7. The system of claim 5, wherein the terminal ends are functionally connected to optical controls.

8. A method for measuring a parameter in a wellbore, the method comprising the steps of:
    providing a non-optic fiber multi-mode planar waveguide comprising a substrate forming a U-shaped path between an input end and an output end and a sensor carried by the substrate and in functional connection with the U-shaped path;
    forming a continuous multi-mode optical circuit by connecting a first multi-mode optic fiber to the input end and second multi-mode optic fiber to the output end;

deploying the continuous multi-mode optic circuit into the wellbore;

sensing a parameter via the sensor, wherein the parameter comprising one selected from the group of pressure, temperature, chemical activity and seismic activity; and conducting a signal responsive to the parameter via the continuous multi-mode optical circuit.

9. The method of claim 8, wherein the U-shaped path has a bend radius less than that of miniature bend that could be formed in the first or second optic fiber with comparable optical performance.

* * * * *